(12) United States Patent
Nadeau et al.

(10) Patent No.: US 11,149,880 B2
(45) Date of Patent: Oct. 19, 2021

(54) COMPOSITE TUBING AND METHOD FOR MAKING AND USING SAME

(71) Applicant: Saint-Gobain Performance Plastics Corporation, Solon, OH (US)

(72) Inventors: Adam P. Nadeau, Boylston, MA (US); Michael J. Tzivanis, Chicopee, MA (US); Michael E. Cahill, Waunakee, WI (US); Robert D. Schwenker, Austin, TX (US); Ashok Mohanty, Marlborough, MA (US); Aijun Zhu, Acton, MA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 596 days.

(21) Appl. No.: 14/973,191

(22) Filed: Dec. 17, 2015

(65) Prior Publication Data

US 2016/0178091 A1  Jun. 23, 2016

Related U.S. Application Data

(60) Provisional application No. 62/093,292, filed on Dec. 17, 2014.

(51) Int. Cl.
*F16L 11/00* (2006.01)
*F16L 9/12* (2006.01)
(Continued)

(52) U.S. Cl.
CPC .......... *F16L 9/121* (2013.01); *B29C 48/0021* (2019.02); *B29C 48/09* (2019.02);
(Continued)

(58) Field of Classification Search
CPC ..................................................... F16L 9/121
(Continued)

(56) References Cited

U.S. PATENT DOCUMENTS

| | | | | |
|---|---|---|---|---|
| 3,422,855 A | * | 1/1969 | Weyer | F01N 13/16 138/141 |
| 3,561,493 A | * | 2/1971 | Maillard | F16L 9/121 138/137 |

(Continued)

FOREIGN PATENT DOCUMENTS

| | | |
|---|---|---|
| CN | 101896334 A | 11/2010 |
| CN | 103372987 A | 10/2013 |

(Continued)

OTHER PUBLICATIONS

Wu et al., "Specialty Experiment for Polymer Processing Engineering," Jul. 31, 2013, pp. 158-159, China Light Industry Press.

*Primary Examiner* — James F Hook
(74) *Attorney, Agent, or Firm* — Abel Schillinger, LLP; Chi Suk Kim (57) ABSTRACT

A composite tube includes a first layer including a thermoplastic polymer having a Tg of not greater than about 160° C. and a second layer adjacent to the first layer, the second layer including an extruded silicone material. Further included is a method of forming the composite tube which includes providing a first layer including a thermoplastic polymer having a Tg of not greater than about 160° C.; receiving, by an extrusion system, a silicone material; forming, by the extrusion system, a second layer including the silicone material adjacent to the first layer; and irradiating the silicone material with a radiation source to substantially cure the silicone material.

9 Claims, 6 Drawing Sheets

(51) Int. Cl.
   *B29C 48/151*   (2019.01)
   *B29C 48/00*    (2019.01)
   *B29C 48/09*    (2019.01)
   *B29C 65/14*    (2006.01)
   *B29C 65/70*    (2006.01)
   *F04B 43/00*    (2006.01)
   *F04B 43/12*    (2006.01)
   *F04B 45/08*    (2006.01)
   *B29L 9/00*     (2006.01)
   *B29C 35/08*    (2006.01)
   *B29K 83/00*    (2006.01)
   *B29K 101/12*   (2006.01)
   *F16L 11/04*    (2006.01)
   *B29L 23/00*    (2006.01)

(52) U.S. Cl.
   CPC ............ B29C 48/151 (2019.02); B29C 65/14 (2013.01); B29C 65/70 (2013.01); F04B 43/0072 (2013.01); F04B 43/12 (2013.01); F04B 45/08 (2013.01); *B29C 2035/0822* (2013.01); *B29C 2035/0827* (2013.01); *B29C 2035/0833* (2013.01); *B29K 2083/005* (2013.01); *B29K 2101/12* (2013.01); *B29L 2009/00* (2013.01); *B29L 2023/00* (2013.01); *F16L 11/04* (2013.01)

(58) Field of Classification Search
   USPC .............................. 138/137, 141; 428/36.91
   See application file for complete search history.

(56) References Cited

U.S. PATENT DOCUMENTS

| | | | |
|---|---|---|---|
| 3,875,970 A * | 4/1975 | Fitter | F04B 43/1253 138/110 |
| 3,905,398 A * | 9/1975 | Johansen | F16L 11/085 138/124 |
| 4,101,699 A * | 7/1978 | Stine | B29C 71/04 428/36.91 |
| 4,190,088 A * | 2/1980 | Lalikos | F16L 11/12 138/104 |
| 4,209,597 A | 6/1980 | Bremholt | |
| 4,261,390 A * | 4/1981 | Belofsky | F16L 11/085 138/125 |
| 4,303,457 A * | 12/1981 | Johansen | D04C 1/06 156/149 |
| 4,634,615 A * | 1/1987 | Versteegh | B29C 61/0616 138/141 |
| 4,657,285 A * | 4/1987 | Akiyama | F16L 33/2076 138/103 |
| 4,802,938 A * | 2/1989 | Kitami | B29C 48/21 156/149 |
| 4,880,849 A | 11/1989 | Poole et al. | |
| 4,945,003 A | 7/1990 | Poole et al. | |
| 5,049,426 A * | 9/1991 | Kimura | B32B 27/12 428/36.2 |
| 5,482,447 A * | 1/1996 | Sunden | F04B 43/0072 138/119 |
| 5,718,957 A * | 2/1998 | Yokoe | B29C 47/0023 428/36.91 |
| 5,799,704 A * | 9/1998 | Andre | F16L 9/121 138/137 |
| 6,053,214 A * | 4/2000 | Sjoberg | B32B 1/08 138/134 |
| 6,179,008 B1 * | 1/2001 | Kawazura | B32B 7/12 138/125 |
| 6,528,137 B2 * | 3/2003 | Franosch | F16L 9/12 428/36.9 |
| 6,709,742 B2 | 3/2004 | Ladika et al. | |
| 7,744,803 B2 | 6/2010 | Jackson et al. | |
| 7,878,773 B2 * | 2/2011 | Zumbrum | F04B 43/0072 417/477.11 |
| 7,923,121 B2 | 4/2011 | Jackson et al. | |
| 8,012,555 B2 * | 9/2011 | Zumbrum | F04B 43/1253 428/36.8 |
| 8,622,994 B2 | 1/2014 | Wendlandt et al. | |
| 9,206,315 B2 * | 12/2015 | Prusty | B29C 48/10 |
| 2002/0036020 A1 * | 3/2002 | Noone | B32B 1/08 138/137 |
| 2003/0060801 A1 * | 3/2003 | Chong | A61L 29/085 604/523 |
| 2003/0077411 A1 * | 4/2003 | Hibino | F16L 11/118 428/36.91 |
| 2003/0118765 A1 * | 6/2003 | Govaerts | B32B 1/08 428/36.91 |
| 2004/0058162 A1 | 3/2004 | Tukachinsky et al. | |
| 2004/0112453 A1 * | 6/2004 | Bremard | F16L 11/06 138/137 |
| 2004/0265524 A1 * | 12/2004 | Wideman | B32B 1/08 428/35.7 |
| 2006/0099368 A1 * | 5/2006 | Park | B32B 1/08 428/36.91 |
| 2006/0127620 A1 * | 6/2006 | Fisher | F16L 11/127 428/36.91 |
| 2007/0048476 A1 * | 3/2007 | Park | B29C 47/0004 428/36.91 |
| 2007/0051418 A1 * | 3/2007 | Rowles | F16L 9/133 138/137 |
| 2008/0035228 A1 * | 2/2008 | Bentley | B29C 44/22 138/127 |
| 2008/0045619 A1 | 2/2008 | Jackson et al. | |
| 2008/0053553 A1 * | 3/2008 | Doshi | B32B 1/08 138/137 |
| 2008/0166509 A1 | 7/2008 | Simon et al. | |
| 2009/0169790 A1 * | 7/2009 | Nadeau | B29C 47/0023 428/36.91 |
| 2010/0108172 A1 * | 5/2010 | Liu | F16L 11/00 138/137 |
| 2010/0147446 A1 * | 6/2010 | Ciolczyk | F16L 9/133 156/191 |
| 2011/0114215 A1 * | 5/2011 | Jeruzal | B29C 43/36 138/150 |
| 2011/0264057 A1 * | 10/2011 | Eversull | A61L 29/085 604/265 |
| 2012/0192987 A1 | 8/2012 | Haschke | |
| 2012/0213958 A1 * | 8/2012 | Golub | B32B 1/08 428/36.91 |
| 2013/0068335 A1 * | 3/2013 | Oyaizu | F16L 11/085 138/137 |
| 2013/0319570 A1 | 12/2013 | Winterstein et al. | |
| 2014/0037880 A1 * | 2/2014 | Siddhamalli | B29D 23/00 428/36.91 |
| 2014/0124080 A1 * | 5/2014 | Hellfeier | B32B 5/026 138/137 |
| 2014/0283940 A1 * | 9/2014 | Bourgeois | B29C 66/5344 138/137 |
| 2015/0091218 A1 * | 4/2015 | Serebrennikov | B29C 45/0053 264/478 |
| 2015/0252918 A1 * | 9/2015 | Garver | F16L 11/04 138/137 |

FOREIGN PATENT DOCUMENTS

| | | |
|---|---|---|
| EP | 0490854 A2 | 6/1992 |
| EP | 2046887 B1 | 4/2012 |
| JP | 2012017841 A | 1/2012 |
| WO | 2006072338 A1 | 7/2006 |
| WO | 2008014597 A1 | 2/2008 |
| WO | 2010078527 A2 | 7/2010 |

\* cited by examiner

COMPOSITE TUBING AND METHOD FOR MAKING AND USING SAME

CROSS-REFERENCE TO RELATED APPLICATION

This application claims priority under 35 U.S.C. § 119(e) to U.S. Provisional App. No. 62/093,292, entitled "COMPOSITE TUBING AND METHOD FOR MAKING AND USING SAME", by Adam P. Nadeau et al., filed Dec. 17, 2014, which is assigned to the current assignee hereof and incorporated herein by reference in its entirety.

FIELD OF THE DISCLOSURE

The disclosure, generally, is related to a composite tube and method of forming the composite tube.

BACKGROUND

Many industries utilize silicone tubing for the delivery and removal of fluids because silicone tubing is non-toxic, flexible, thermally stable, has low chemical reactivity, and can be produced in a variety of sizes when compared with tubing made from other materials. For example, silicone tubing may be used in a variety of industries such as the medical industry, pharmaceutical industry, food delivery, and the like. However, silicone tubing is limited due to its undesirable permeation rates attributed to air ingress in the fluid path and evaporation of water-based solutions in the fluid path.

Composite tubing is a multiple layer tubing system. Composite tubing is desirable with a silicone material as one of the layers; however, composite tubing is typically formed by heat curing silicone materials at an elevated temperature. For instance, temperatures in excess of at least 150° C., such as at least 160° C., such as at least 170° C., or even up to or greater than 200° C., are used for the heat cure. For particular multiple layer extruded tubing, the temperatures used for thermal cure of the silicone material often exceed the melting temperature, heat deflection temperature, or glass transition temperature of many desirable polymers.

Accordingly, silicone materials have typically been commercially used with high melt temperature substrates for multiple layer articles. These multiple layer articles are typically expensive since they are limited to high melt temperature substrates. Low melt temperature substrates, such as certain thermoplastic materials, would be desirable since they are often more cost effective; however, there has been considerable difficulty with forming silicone materials with low melt temperature substrates, particularly with an extrusion process. Unfortunately, the heat required for thermal cure of the silicone material prevents the use of many thermoplastic materials that would degrade and deform at such temperatures. Furthermore, adhesion between dissimilar materials such as silicone materials and thermoplastic materials can be problematic, such that adhesion promoters, primers, chemical surface treatments, or even mechanical treatments are used to provide the adhesion required for specific applications.

Accordingly, an improved method and apparatus to form a multiple layer composite tube are desired.

SUMMARY

In an embodiment, a composite tube includes a first layer including a thermoplastic polymer having a Tg of not greater than about 160° C.; and a second layer adjacent to the first layer, the second layer including an extruded silicone material.

In another embodiment, a method of forming a composite tube includes providing a first layer including a thermoplastic polymer having a Tg of not greater than about 160° C.; receiving, by an extrusion system, a silicone material; forming, by the extrusion system, a second layer including the silicone material adjacent to the first layer; and irradiating the silicone material with a radiation source to substantially cure the silicone material.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following description in combination with the figures is provided to assist in understanding the teachings disclosed herein. The following discussion focuses on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having" or any other variation thereof, are open-ended terms and should be interpreted to mean "including, but not limited to . . . ." These terms encompass the more restrictive terms "consisting essentially of" and "consisting of." In an embodiment, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts. Unless indicated otherwise, all measurements are at about 25° C. For instance, values for viscosity are at 25° C., unless indicated otherwise.

The disclosure generally relates to composite tubing, and in particular, to composite tubing including a first layer and a second layer. The first layer includes a thermoplastic polymer. The second layer includes an extruded silicone material. In an embodiment, a composite tube can include a hollow body having an inner bore. The hollow body can also have an inner diameter, an outer diameter, and a length of at least about 2 meters, at least about 5 meters, at least about 10 meters, at least about 20 meters, at least about 30 meters, at least about 50 meters, or even about 100 meters.

In an embodiment, the first layer may be any thermoplastic polymer envisioned having a Tg (glass transition temperature) of not greater than about 160° C., such as not greater than 150° C., such as not greater than about 100° C., such as not greater than about 80° C., or even not greater than about 50° C. In a particular embodiment, the thermoplastic polymer has a Tg of not greater than 50° C. In an embodiment, the thermoplastic polymer has a Tg of about −200° C. to about 160° C., such as about −200° C. to about 150° C., such as about −200° C. to about 100° C., such as about −200° C. to about 80° C., or even about −200° C. to about 50° C. For instance, the Tg of the thermoplastic polymer is particularly advantageous for the present composite tube. In fact, a composite tube of length greater than 2 meters has yet to be achieved with a thermoplastic polymer having a glass transition temperature of not greater than about 100° C. in combination with the second layer of a silicone material. In a particular embodiment, the thermoplastic polymer is a polystyrene, a polyester, a silicone copolymer, silicone thermoplastic vulcanizate, a copolyester such as a copolyester elastomer, a polyamide, a fluoropolymer, a polyethylene, a polypropylene, a polyether-ester copolymer, a thermoplastic urethane, a polyether amide block copolymer, a polyamide copolymer, a styrene block copolymer, a polycarbonate, a polyolefin elastomer, a thermoplastic vulcanizate, an ionomer, a polyoxymethylene (POM), an acrylonitrile butadiene styrene (ABS), an acetal, an acrylic, a polyvinyl chloride (PVC), or combination thereof. In a more particular embodiment, the thermoplastic polymer is a copolyester elastomer, a polyether-ester block copolymer, or a thermoplastic polyurethane.

The thermoplastic polymer may be formed with any reasonable component such as any precursors with the addition of any catalyst, any filler, any additive, or combination thereof. Any reasonable catalyst that can initiate crosslinking of the first polymer is envisioned. In an embodiment, the catalyst is activated by a radiation source. In a particular embodiment, any reasonable catalyst that is activated by a radiation source is envisioned. Exemplary catalysts include a catalyst that may be heat cured, IR radiation cured, e-beam cured, or combination thereof, such as a peroxide, a benzophenone, or combination thereof. The catalyst may or may not be used in combination with a crosslinker promoter, such as triallyl cyanurate (TAC), triallyl isocyanurate (TAIC), or combination thereof. In an embodiment, the additive includes any reasonable adhesion promoter. Any reasonable adhesion promoter that promotes adhesion of the thermoplastic polymer layer to the layer it is directly in contact with is envisioned and is dependent upon the thermoplastic polymer. In an embodiment, the adhesion promoter is used with the silicone copolymer or the silicone thermoplastic vulcanizate, wherein the adhesion promoter is a siloxane or a silane, such as 3-methacryloxypropyltrimethoxysilane, 3-glycidoxypropyltrimethoxysilane, vinyltris(2-methoxyethoxy)-silane; 2,5,7,10-tetraoxa-6-silaundecane, 6-ethenyl-6-(2-methoxyethoxy)-silane, or any combination thereof. In a particular embodiment, the precursor, the catalyst, the filler, the additive, or combination thereof are dependent upon the thermoplastic polymer chosen and final properties desired for the composite tube. In an embodiment, the material content of the first layer is essentially 100% thermoplastic polymer. In some embodiments, the first layer consists essentially of the respective thermoplastic polymer described above. In an embodiment, the thermoplastic polymer consists essentially of the respective thermoplastic polymer and a catalyst as described. As used herein, the phrase "consists essentially of" used in connection with the thermoplastic material precludes the presence of materials that affect the basic and novel characteristics of the thermoplastic polymer, although, commonly used processing agents and additives may be used in the thermoplastic polymer.

In an embodiment, the second layer includes a silicone material. In a more particular embodiment, the silicone material is an extruded silicone material. In an even more particular embodiment, the silicone material is cured via a radiation source. The source of radiation energy can include any reasonable radiation energy source such as actinic radiation. In a particular embodiment, the radiation source is ultraviolet light. Any reasonable wavelength of ultraviolet light is envisioned. In a specific embodiment, the ultraviolet light is at a wavelength of about 10 nanometers to about 410 nanometers. Further, any number of applications of radiation energy may be applied with the same or different wavelengths, depending upon the material and the desired result. It will be appreciated that the wavelength can be within a range between any of the minimum and maximum values noted above.

In an embodiment, the silicone material is a high consistency rubber (HCR), a liquid silicone rubber (LSR), a room temperature vulcanizing silicone (RTV), or a combination thereof. In a particular embodiment, the silicone material is a liquid silicone rubber. The liquid silicone rubber typically has a viscosity prior to cure of about 50,000 centipoise (cPs) to about 2,000,000 cPs, such as about 200,000 cPs to about 1,000,000 cPs, such as about 500,000 cPs to about 800,000 cPs. In an alternative embodiment, the silicone material is a high consistency rubber. Prior to cure, the high consistency rubber typically has a viscosity of greater than about 2,000,000 centipoise, such as about 2,000,000 cps to about 500,000,000 cps. It will be appreciated that the viscosity of the silicone material can be within a range between any of the minimum and maximum values noted above.

The silicone material may, for example, include polyalkylsiloxanes, such as silicone polymers formed of a precursor, such as dimethylsiloxane, diethylsiloxane, dipropylsiloxane, methylethylsiloxane, methylpropylsiloxane, or combinations thereof. In a particular embodiment, the polyalkylsiloxane includes a polydialkylsiloxane, such as polydimethylsiloxane (PDMS). In a particular embodiment, the polyalkylsiloxane is a silicone hydride-containing polyalkylsiloxane, such as a silicone hydride-containing polydimethylsiloxane. In a further embodiment, the polyalkylsiloxane is a vinyl-containing polyalkylsiloxane, such as a vinyl-containing polydimethylsiloxane. In yet another embodiment, the silicone polymer is a combination of a hydride-containing polyalkylsiloxane and a vinyl-containing polyalkylsiloxane, such as a combination of hydride-containing polydimethylsiloxane and a vinyl-containing polydimethylsiloxane. In an example, the silicone polymer is non-polar and is free of halide functional groups, such as chlorine and fluorine, and of phenyl functional groups. Alternatively, the silicone polymer may include halide functional groups or phenyl functional groups. For example, the silicone polymer may include fluorosilicone or phenylsilicone.

The silicone material may further include a catalyst. Typically, the catalyst is present to initiate the crosslinking process. Any reasonable catalyst that can initiate crosslinking when exposed to a radiation source is envisioned. Typically, the catalyst is dependent upon the silicone material. In a particular embodiment, the catalytic reaction includes aliphatically unsaturated groups reacted with Si-bonded hydrogen in order to convert the addition-crosslinkable silicone material into the elastomeric state by formation of a network. In a more particular embodiment, the catalyst is activated by the radiation source and initiates the crosslinking process.

Any catalyst is envisioned depending upon the silicone material, with the proviso that at least one catalyst can initiate crosslinking when exposed to the radiation source, such as ultraviolet radiation. In an embodiment, a hydrosilylation reaction catalyst may be used. For instance, an exemplary hydrosilylation catalyst is an organometallic complex compound of a transition metal. In an embodiment, the catalyst includes platinum, rhodium, ruthenium, the like, or combinations thereof. In a particular embodiment, the catalyst includes platinum. Further any reasonable optional catalyst may be used with the hydrosilylation catalyst. In an embodiment, the optional catalyst may or may not initiate crosslinking when exposed to a radiation source. Exemplary optional catalysts may include peroxide, tin, or combinations thereof. Alternatively, the silicone material further includes a peroxide catalyzed silicone material. In another example, the silicone material may be a combination of a platinum catalyzed and peroxide catalyzed silicone material.

The silicone material may further include an additive. Any reasonable additive is envisioned. Exemplary additives may include, individually or in combination, a vinyl polymer, a hydride, an adhesion promoter, a filler, an initiator, an inhibitor, a colorant, a pigment, a carrier material, or any combination thereof. For instance, the additive may include an adhesion promoter. Any reasonable adhesion promoter that promotes adhesion of the silicone material to the layer it is directly in contact with is envisioned and is dependent upon the silicone material. In an embodiment, the adhesion promoter may include a siloxane or a silane, such as 3-methacryloxypropyltrimethoxysilane, 3-glycidoxypropyltrimethoxysilane, vinyl-tris(2-methoxyethoxy)-silane; 2,5,7,10-tetraoxa-6-silaundecane, 6-ethenyl-6-(2-methoxyethoxy)-silane, or any combination thereof. In an embodiment, the material content of the silicone layer is essentially 100% silicone material. In some embodiments, the silicone material consists essentially of the respective silicone polymer and catalyst as described above. In an embodiment, the silicone material consists essentially of the respective silicone polymer, catalyst, and an adhesion promoter. As used herein, the phrase "consists essentially of" used in connection with the silicone material precludes the presence of non-silicone polymers that affect the basic and novel characteristics of the silicone material, although, commonly used processing agents and additives may be used in the silicone material.

The silicone material may include a conventional, commercially prepared silicone material. The commercially prepared silicone material typically includes components such as the non-polar silicone polymer, the catalyst, a filler, and optional additives. Any reasonable filler and additives are envisioned. Particular embodiments of a commercially available liquid silicone rubber (LSR) include Wacker Elastosil® LR 3003/50 by Wacker Silicone of Adrian, Mich. and Rhodia Silbione® LSR 4340 by Rhodia Silicones of Ventura, Calif.

Figure 1:
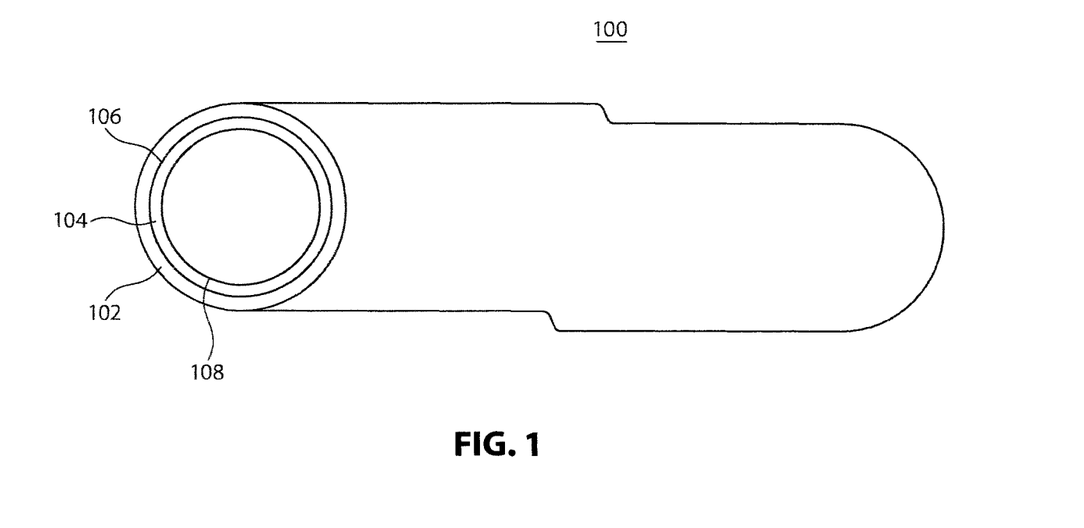
FIGS. 1 and 2 include illustrations of exemplary multi-layer tubes.

As illustrated in FIG. 1, a multi-layer tube 100 is an elongated annular structure with a hollow central bore. The multi-layer tube 100 includes a first layer 102 and a second layer 104. The first layer 102 may be directly in contact with and may directly bond to the second layer 104 along an outer surface 106 of the second layer 104. For example, the first layer 102 may directly bond to the second layer 104 without intervening adhesive layers, such as a primer. In an exemplary embodiment, the multi-layer tube 100 includes two layers, such as the first layer 102 and the second layer 104. As illustrated, the second layer, i.e. the silicone material, includes an inner surface 108 that defines a central lumen of the tube.

Figure 2:
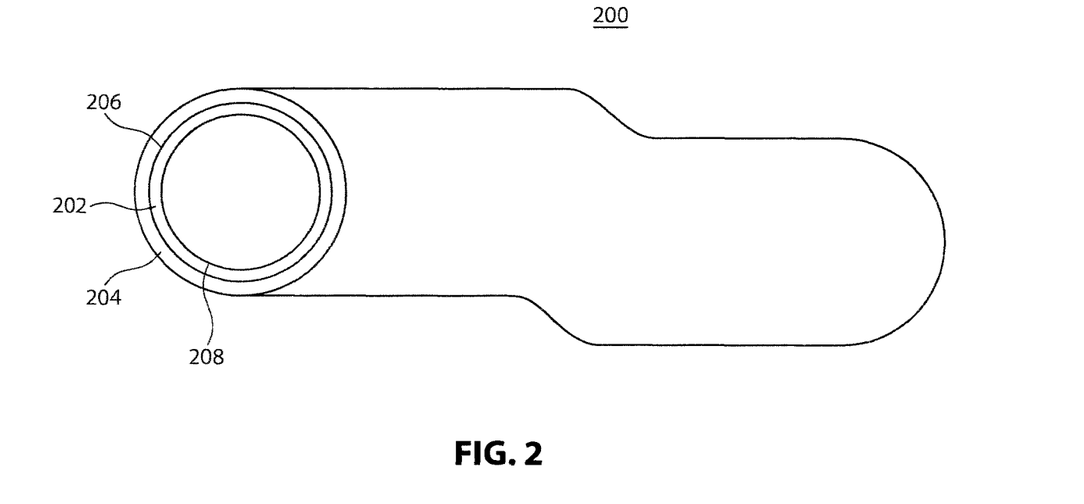

In an alternative embodiment and as seen in FIG. 2, a multi-layer tube 200 is an elongated annular structure with a hollow central bore. The multi-layer tube 200 includes a first layer 202 and a second layer 204. The first layer 202 may be directly in contact with and may directly bond to the second layer 204 along an outer surface 206 of the second layer 204. For example, the first layer 202 may directly bond to the second layer 204 without intervening adhesive layers, such as a primer. In an exemplary embodiment, the multi-layer tube 200 includes two layers, i.e. such as the first layer 202 and the second layer 204. As illustrated, the first layer, i.e. the thermoplastic material, includes an inner surface 208 that defines a central lumen of the tube.

Although illustrated as two layers, any number of layers is envisioned. For instance, the composite tube includes at least two layers, at least three layers, or even a greater number of layers. The number of layers is dependent upon the final properties desired for the composite tube. The composite tube may further include other layers. Other layers include, for example, a polymeric layer, a reinforcing layer, an adhesive layer, a barrier layer, a chemically resistant layer, a metal layer, any combination thereof, and the like. Any reasonable method of providing any additional layer is envisioned and is dependent upon the material chosen. For instance, the additional layer may be an additional polymeric layer of a silicone material that may or may not be extruded and may or may not be cured via ultraviolet radiation as the inner layer of the composite tube with at least one layer of a thermoplastic polymer having a Tg of less than about 160° C. adjacent to the additional polymeric layer and an extruded silicone material adjacent to the thermoplastic polymer. In an embodiment, any number of polymeric layers as described as the first layer, i.e. thermoplastic material, and the second layer, i.e. silicone material, are envisioned. In an example, the composite tube includes an exemplary tube as illustrated by FIG. 1 with an additional layer of a silicone material on the outside surface of the first layer, i.e. the thermoplastic material. Any thickness of the other layers may be envisioned.

In an embodiment, the composite tube may be formed by any reasonable means and is dependent upon the material and the configured location of the first layer and the second layer within the composite tube. In an example, the first layer of the thermoplastic material is provided with the second layer formed thereon, as seen in FIG. 2. Typically, the thermoplastic material is provided by any reasonable means such as extrusion or injection molding. With both extrusion and injection molding, the thermoplastic material is mixed before being provided as a first layer. Any reasonable mixing apparatus is envisioned. In an embodiment, the thermoplastic material may be temperature controlled within the pumping system. Temperature control may include heating, cooling, or any combination thereof. For instance, any reasonable temperature control for the components of the thermoplastic material may be used to provide a material that can flow from the pumping system to an interior cavity of a molding system or an extrusion die without degradation of the thermoplastic material. The temperature is typically dependent upon on the material chosen for the thermoplastic material. The thermoplastic material is formed into a layer, such as a layer of the composite tube.

In a particular embodiment, the first layer of the thermoplastic material is formed via extrusion. Any reasonable extrusion system is envisioned. The extrusion system typically includes a pumping system and can include a number of devices that can be utilized to form at least one layer of the composite tube. For example, the pumping system can include a pumping device such as a gear pump, a static mixer, an extruder, a tube die, a radiation cure device, a post-processing device, or any combination thereof. In an exemplary embodiment, the thermoplastic polymer may be melt processed by dry blending or compounding. The dry blend may be in powder, granular, or pellet form. In a particular embodiment, to form the first layer of the composite tube, pellets of the corresponding monomer or polymer may be compounded through a co-rotating intermeshing twin-screw extruder, cooled by a water bath, and cut into compound pellets. The first layer may be made by a continuous compounding process or batch related process. In an embodiment, the resulting pellets of the blend are fed into an extruder with a tube die. The first layer is extruded through the tube die to form a layer of the composite tube.

In an embodiment, the thermoplastic polymer is cured. Any cure conditions are envisioned, such as radiation cure. In a particular embodiment, the radiation source is sufficient to substantially cure the thermoplastic material. "Substantially cure" as used herein refers to >90% of final crosslinking density, as determined for instance by rheometer data (90% cure means the material reaches 90% of the maximum torque as measured by ASTM D5289). For instance, the level of cure is to provide the first layer of the composite tube having a desirable durometer. In an embodiment, the final durometer of the first layer depends on the material chosen for the first layer. Any reasonable radiation source is envisioned such as actinic radiation. In an embodiment, the radiation source is ultraviolet light (UV). In a particular embodiment, curing the thermoplastic material includes irradiating with ultraviolet energy with a wavelength of about 10 nanometers (nm) to about 410 nm. Further, any number of applications of radiation energy may be applied with the same or different wavelengths. For example, the extrusion system can include one or more ovens (e.g. infrared (IR) ovens, air ovens), one or more baths (e.g. salt water baths), or a combination thereof, to cure the thermoplastic material. The one or more IR ovens can operate at a particular peak wavelength. In certain instances, the peak wavelength of a first IR oven can be different from the peak wavelength of a second IR oven. In an embodiment, the thermoplastic material can be subjected to a heat treatment for a specified period of time. In a particular embodiment, the thermoplastic material can be subjected to curing in a first IR oven for a first period of time and then subject to curing in a second IR oven for a second period of time that is different from the first period of time. In one particular embodiment, use is made of a short wavelength IR oven. By short wavelength, it is meant that the peak wavelength is below 4 microns, typically below 3 microns, such as within a range of approximately 0.6 to 2.0 microns, such as 0.8 to 1.8 microns. Generally medium and longer wavelength IR ovens are characterized by a peak wavelength on the order of 4 to 8 microns, or even higher. It will be appreciated that the wavelength can be within a range between any of the minimum and maximum values noted above.

In a particular embodiment, the radiation curing can occur while the thermoplastic material flows through the pumping system, as the thermoplastic material flows through the tube die, as the thermoplastic material directly exits the tube die, or any combination thereof to form the thermoplastic layer. The radiation curing provides a continuous process of forming the thermoplastic layer.

In an embodiment, thermal treatment may be applied. Any temperature for thermal treatment is envisioned. In an embodiment, the thermal treatment is at a temperature not greater than the heat deflection temperature (HDT) of the first layer, i.e. the thermoplastic material. Exemplary thermal treatment includes temperatures, for instance, of greater than about 20° C., such as greater than about 100° C., or even greater than about 150° C. In a particular embodiment, the temperature is about 20° C. to about 150° C., such as about 20° C. to about 120° C., such as about 20° C. to about 100° C., or even about 40° C. to about 80° C. In an embodiment, the thermoplastic material may be subjected to the radiation source and the thermal treatment in sequence, concurrently, or any combination thereof.

After the first layer, i.e. the thermoplastic material, is formed, the first layer may be surface treated on a surface that is adjacent to the second layer. In a particular embodiment, the first layer is surface treated prior to forming the second layer over the first layer. The surface treatment is to increase the adhesion of the first layer to the second layer when the first layer is in direct contact with the second layer. In an embodiment, the surface treatment enables adhesion between the two layers to provide cohesive bonding, i.e. cohesive failure occurs wherein the structural integrity of the thermoplastic material and/or the silicone material fails before the bond between the two materials fails. The surface treatment may include radiation treatment, chemical etch, physical-mechanical etch, plasma etch, corona treatment, chemical vapor deposition, or any combinations thereof.

Irradiating includes, for example, irradiating the surface of the first layer with any ultraviolet energy sufficient to substantially increase the adhesion of the first layer to the second layer, compared to a surface that has not been irradiated. In an embodiment, the ultraviolet energy is a wavelength of about 10 nanometers (nm) to about 410 nm. It will be appreciated that the wavelength can be within a range between any of the minimum and maximum values noted above. Further, thermal treatment may be applied to enhance the surface treatment. Any temperature for thermal treatment is envisioned. In an embodiment, the thermal treatment is at a temperature not greater than the heat deflection temperature (HDT) of the thermoplastic material. In an embodiment, thermal treatment occurs at a low temperature. "Low temperature" is defined herein as the temperature below the heat deflection (HDT) of the first polymer material and is dependent upon the material. Exemplary low temperature thermal treatment includes temperatures, for instance, of greater than about 20° C., such as greater than about 100° C., or even greater than about 150° C. In a particular embodiment, the temperature is about 20° C. to about 150° C., such as about 20° C. to about 120° C., such as about 20° C. to about 100° C., or even about 40° C. to about 80° C. It will be appreciated that the low temperature thermal treatment can be within a range between any of the minimum and maximum values noted above. In an embodiment, the first layer may be subjected to the radiation source and the low temperature thermal treatment in sequence, concurrently, or any combination thereof.

In an embodiment, chemical etch includes sodium ammonia and sodium naphthalene. Physical-mechanical etch may include sandblasting and air abrasion. In another embodiment, plasma etching includes reactive plasmas such as hydrogen, oxygen, acetylene, methane, and mixtures thereof with nitrogen, argon, and helium. Corona treatment may include the reactive hydrocarbon vapors, such as acetone. In an embodiment, the chemical vapor deposition includes the use of acrylates, vinylidene chloride, or acetone. In an embodiment, the surface of the first layer is free of any surface treatment. In an embodiment, the adhesion between the first layer and the second layer may be improved through the use of an adhesive layer, such as a primer. In an alternative embodiment, the surface between the first layer and the second layer are free of a primer.

In an embodiment, the second layer, i.e. the silicone material, is formed by an extrusion system, which may be the same or different than the extrusion system used for the first layer. When the first layer, i.e. the thermoplastic material, has the inner surface that defines a central lumen of the tube, the second layer, i.e. the silicone material is extruded over the first layer. The method includes receiving, by an extrusion system, the silicone material as described above. In an embodiment, a cross-head die is used to allow extrusion of at least one layer over an adjacent layer.

Typically, the silicone material is mixed and pumped, i.e. extruded, through a tube die of the extrusion system. Any reasonable mixing apparatus is envisioned. In an embodiment, heat may also be applied to the silicone material. For instance, any reasonable heating temperature for the components of the silicone material may be used to provide a material that can flow from the pumping system and extruded through the die without degradation of the material. For instance, the temperature may be about 10° C. to about 70° C. It will be appreciated that the heating temperature can be within a range between any of the minimum and maximum values noted above.

In an embodiment, the silicone material is radiation cured. In a particular embodiment, the radiation curing can occur while the silicone material flows through the pumping system, as the silicone material flows through the die, as the silicone material directly exits the die, or any combination thereof to form the silicone layer. The radiation curing provides a continuous process of forming the silicone layer. In an embodiment, the radiation curing of the silicone material can include subjecting the silicone material to one or more radiation sources. In a particular embodiment, the radiation source is sufficient to substantially cure the silicone material of the second layer. For instance, the level of cure is to provide a desirable durometer for the second layer of the composite tube. In an embodiment, the final durometer of the second layer depends on the material chosen for the second layer. The radiation source cures the second layer to provide a composite tube with desirable and in some cases, improved properties compared to a composite tube having a second layer of silicone material cured by conventional heat cure. "Conventional heat cure" as used herein refers to curing via heat at a temperature greater than about 150° C.

Any reasonable radiation source is envisioned such as actinic radiation. In an embodiment, the radiation source is ultraviolet light (UV). Any reasonable wavelength of ultraviolet light is envisioned. In a specific embodiment, the ultraviolet light is at a wavelength of about 10 nanometers to about 500 nanometers, such as a wavelength of about 200 nanometers to about 400 nanometers. Further, any number of applications of radiation energy may be applied with the same or different wavelengths. For example, the extrusion system can include one or more ovens (e.g. infrared (IR) ovens, air ovens), one or more baths (e.g. salt water baths), or a combination thereof, to cure the silicone material. The one or more IR ovens can operate at a particular peak wavelength. In certain instances, the peak wavelength of a first IR oven can be different from the peak wavelength of a second IR oven. In an embodiment, the silicone material can be subjected to a heat treatment for a specified period of time. In a particular embodiment, the silicone material can be subjected to curing in a first IR oven for a first period of time and then subject to curing in a second IR oven for a second period of time that is different from the first period of time. In one particular embodiment, use is made of a short wavelength IR oven. By short wavelength, it is meant that the peak wavelength is below 4 microns, typically below 3 microns, such as within a range of approximately 0.6 to 2.0 microns, such as 0.8 to 1.8 microns. Generally medium and longer wavelength IR ovens are characterized by a peak wavelength on the order of 4 to 8 microns, or even higher. It will be appreciated that the wavelength can be within a range between any of the minimum and maximum values noted above.

The process of forming the composite tube may further include thermal treatment of the second layer, as an individual layer or when in combination with the first layer. Any temperature for thermal treatment is envisioned. In an embodiment, the thermal treatment is at a temperature not greater than the heat deflection temperature (HDT) of the first layer, i.e. the thermoplastic material. In an embodiment, thermal treatment is the low temperature thermal treatment. In an embodiment, the source of radiation and the low temperature thermal treatment may occur concurrently, in sequence, or any combination thereof. In a particular embodiment, the source of radiation and low temperature thermal treatment occurs concurrently.

Although the second layer is described in this embodiment as being delivered after the first layer is provided, any order of delivery of the first layer, delivery of the second layer, radiation source, heat treatment, or combination thereof is envisioned. For instance, when the second layer, i.e. the silicone material, has the inner surface that defines a central lumen of the tube as seen in FIG. 1, the second layer is formed with the first layer, i.e. the thermoplastic material, being subsequently formed over the second layer. In an embodiment, radiation treatment, heat treatment, or combination thereof may occur during or after the formation of each individual layer. In an additional embodiment, the radiation source, the heat treatment, or combination thereof does not occur until after the first layer and the second layer are in direct contact to provide improved adhesion between the silicone material and the thermoplastic material as well as to substantially cure the silicone material to form the composite tube.

Once the first layer and the second layer are formed, the composite tubing can undergo one or more post processing operations. Any reasonable post processing operations are envisioned. For instance, the composite tubing can be subjected to a post-cure heat treatment, such as a post-curing cycle. Post thermal treatment typically occurs at a temperature of about 40° C. to about 200° C. In an embodiment, the post thermal treatment is at a temperature of about 60° C. to about 100° C. Typically, the post thermal treatment occurs for a time period of about 5 minutes to about 10 hours, such as about 10 minutes to about 30 minutes, or alternatively about 1 hour to about 4 hours. It will be appreciated that the post thermal treatment temperature and time can be within a range between any of the minimum and maximum values noted above. In an alternative example, the composite tubing is not subjected to a post thermal treatment. In an example, the composite tubing can be cut into a number of composite tubes having a specified length. In another embodiment, the post processing can include wrapping the composite tube into a coil of tubing.

Any dimensions of the composite tube are envisioned. For instance, any thickness of the layers is envisioned and is typically dependent upon the final properties desired for the composite tube. In an embodiment, the ratio of the thickness of the first layer to the second layer may be 20:1 to 1:20, such as 10:1 to 1:10. It will be appreciated that the ratio of the thickness can be within a range between any of the minimum and maximum values noted above.

Figure 3:
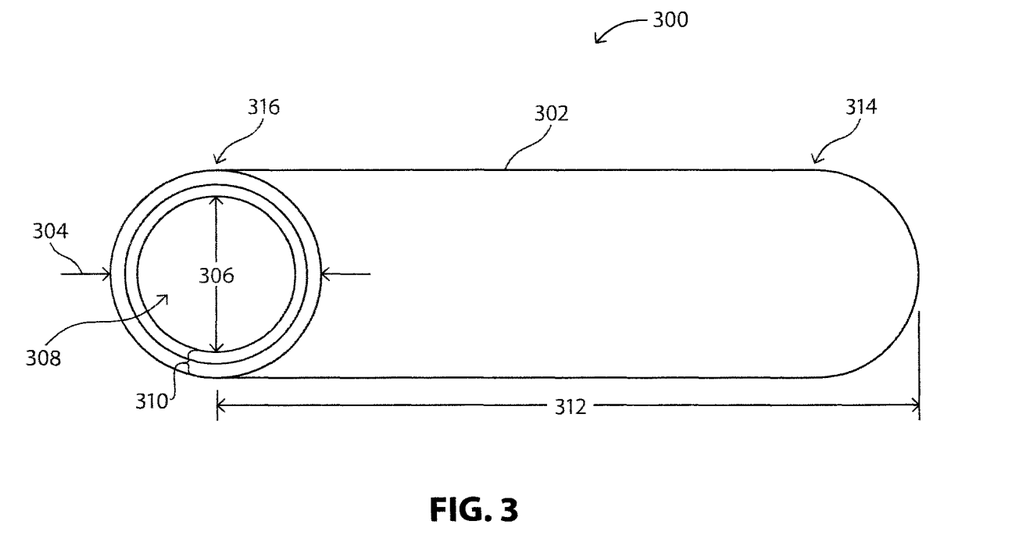
FIG. 3 is a view of a composite tube according to an embodiment.

As seen in FIG. 3, the composite tube 300 can include a body 302 having an outer diameter 304 and an inner diameter 306. The inner diameter 306 can form a hollow bore 308 of the body 302. In addition, the body 302 can include a wall thickness 310 that is measured by the difference between the outer diameter 304 and the inner diameter 306. Further, the body 302 can have a length 312.

In a particular embodiment, the outer diameter 304 can be any reasonable outside diameter envisioned for a composite tube. In a more particular embodiment, the outside diameter is dependent upon the application and the final properties desired. For instance, the outside diameter can be at least approximately 0.25 inch, at least approximately 0.5 inch, or at least approximately 1.5 inch. Any reasonable upper limit is envisioned. It will be appreciated that the outer diameter 304 can be within a range below the minimum value noted above.

In another embodiment, the inner diameter 306 of the body 302 can be any reasonable inner diameter envisioned for a composite tube. In a more particular embodiment, the inner diameter is dependent upon the application and the final properties desired. For instance, the inner diameter can be at least approximately 0.125 inch, at least approximately 0.5 inch, or at least approximately 1.0 inch. Any reasonable upper limit is envisioned. It will be appreciated that the inner diameter 306 can be within a range below the minimum value noted above.

In a further embodiment, the length 312 of the body 302 can be at least approximately 2 meters (m), at least about 5 meters, at least about 10 meters, at least about 20 meters, at least about 30 meters, at least about 50 meters, or even about 100 meters. In another embodiment, the length 312 can be at least approximately 30 m, at least approximately 50 m, at least approximately 100 m, or at least approximately 125 m. The length 312 is generally limited by pragmatic concerns, such as storing and transporting long lengths, or by customer demand for limited production runs, such as 20 m or 100 m. In another embodiment, the length 312 can be at least approximately 30 m, at least approximately 50 m, at least approximately 100 m, or at least approximately 125 m.

Although the cross-section of the inner bore 306 perpendicular to an axial direction of the body 302 in the illustrative embodiment shown in FIG. 3 has a circular shape, the cross-section of the inner bore 306 perpendicular to the axial direction of the body 302 can have a square shape, a triangular shape, or a rectangular shape. It should also be noted that the composite tube 300 is free from any of the visual defects found on tubes formed by a molding process. For example, the composite tube 300 does not include any parting lines. Additionally, knit lines are absent from one or more ends of the body 302, such as a distal end 314, a proximal end 316, or both.

Once formed and cured, particular embodiments of the above-disclosed process advantageously exhibit desired properties such as increased productivity and an improved composite tube. In a particular embodiment, the extrusion and radiation cure of the silicone material can form a composite tube that is not achieved by conventional manufacturing processes. In particular, the extrusion and radiation cure is conducive to forming composite tubes with a silicone material and a thermoplastic material having a Tg that conventional heat cured systems are not able to produce. For instance, the processing conditions provides a composite tube of a continuously extruded silicone material in direct contact with a thermoplastic material having a Tg of less than about 100° C. Furthermore, the radiation cure of at least the second layer of the composite tube provides a final product with increased adhesion of the first layer to the second layer, compared to a composite tube that is conventionally heat cured. Although not being bound by theory, it is believed that the radiation provides instant penetration of the radiation into at least one polymer and curing of the at least one polymer concurrently. In an exemplary embodiment, it is believed that the radiation provides instant penetration of the radiation into the silicone material, thermoplastic material, or combination thereof and curing of the silicone material concurrently.

Furthermore, the radiation curing, with or without thermal curing, provides a faster cure compared to conventional thermal cure. In a particular embodiment, the application of the radiation energy and the thermal treatment provide a cure time for the first layer and/or the second layer that is 20% faster compared to a cure with a single source of energy. In a more particular embodiment, the application of the radiation energy and the thermal treatment provide a cure time for the second layer, such as the silicone material, that is 20% faster compared to a cure with a single source of energy.

The faster cure of the radiation curing, with or without thermal curing, further provides an increased adhesion of the silicone material to the thermoplastic material since it is believed that the increased adhesion reaction rate has a rate comparable to a cross-linking reaction, thus with an increased bonding formation between the silicone material and the thermoplastic material. For instance, the thermoplastic material and the silicone material of the composite tube have a peel strength that exhibits cohesive failure, when tested in a parallel Peel configuration at room temperature. In particular, desirable adhesion may be achieved without a primer, a chemical surface treatment, a mechanical surface treatment, or any combination thereof.

Once formed and cured, particular embodiments of the above-disclosed composite tube advantageously exhibit desired properties such as oxygen permeation rate, chemical permeation rate, water permeation rate, chemical resistance, wettability, and biocompatibility. For instance, the composite tube has an oxygen permeation reduction of greater than about 50%, such as greater than about 60%, such as greater than about 70%, or even greater than about 80%, compared to a traditional silicone tube consisting of a silicone material. In an embodiment, the composite tube has an improved chemical permeation rate and a chemical resistance compared to a traditional silicone tube consisting of a silicone material. In a particular embodiment, chemical resistance is demonstrated with a lower rate and amount of swell when the composite tube is exposed to a chemical. In another embodiment, the composite tube has an average reduction in water loss of greater than about 20%, such as greater than about 30%, such as greater than about 40%, or even greater than about 50%, compared to a traditional silicone tube consisting of a silicone material.

Many industries utilize composite tubing in conjunction with an apparatus for the delivery and removal of fluids. Applications are numerous where, for example, a desirable oxygen permeation rate, chemical permeation rate, pump flow rate, pump life, and/or water permeation rate are desired. Composite tubing may be used in conjunction with any reasonable apparatus. An exemplary apparatus is a medical device, a pharmaceutical device, a biopharmaceutical device, a chemical delivery device, a laboratory device, a water treatment device, a document printing device, a food and beverage device, an industrial cleaning device, an automotive device, an aerospace device, an electronics device, or a fuel delivery device. Further, although described primarily as a composite tube, any article, profile, or film is envisioned containing at least the first layer including a thermoplastic polymer having a Tg of not greater than about 160° C. and a second layer adjacent to the first layer, the second layer including an extruded silicone material.

Figure 4:
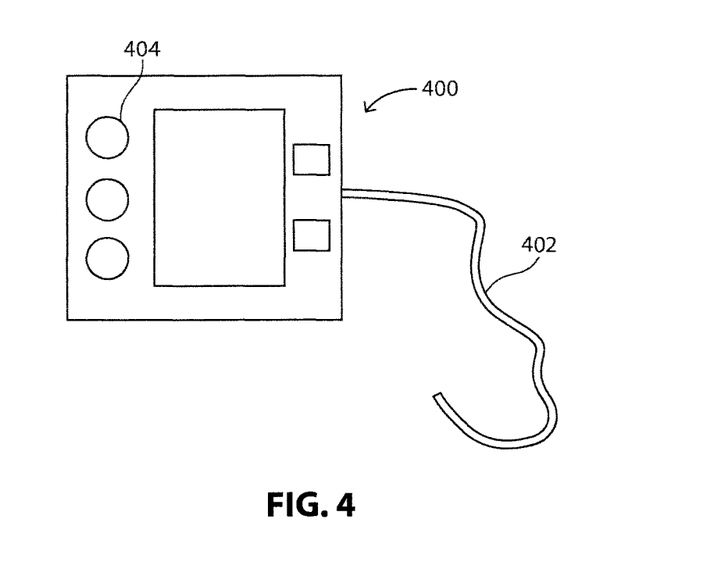
FIG. 4 is a diagram of an apparatus coupled to a composite tube according to an embodiment.

FIG. 4 is a diagram of an apparatus 400 coupled to a composite tube 402 according to an embodiment. The composite tube 402 can be formed from the composite tube 100, 200, 300 of FIGS. 1-3. In an embodiment, the apparatus 400 is a medical device used to provide the fluid to a patient.

In an embodiment, the apparatus 400 can include a pump to dispense fluid via the composite tube 402. In an embodiment, the apparatus 400 can include a peristaltic pump, an infusion pump, an enteral feeding pump, or a combination thereof.

The composite tube can contribute to providing a specified amount of fluid. For example, one or more controls, such as the control 404, can be set to provide a specified flow rate of fluid. An amount of fluid can be dispensed that is within a particular tolerance in relation to the amount specified via the control 404.

In an exemplary embodiment, the composite tube has a desirable flow stability and increased lifetime. In an embodiment, the composite tube may have a pump life of greater than about 100 hours, such as greater than about 200 hours, or even greater than about 400 hours as measured by peristaltic pumping at 400 rpm and 0 psi backpressure. In an exemplary embodiment, the composite tube may have an average reduction in water loss of greater than about 20%, such as greater than about 30%, such as greater than about 40%, or even greater than about 50%, compared to a traditional silicone tube consisting of a silicone material.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

Embodiment 1

A composite tube includes a first layer including a thermoplastic polymer having a Tg of not greater than about 160° C.; and a second layer adjacent to the first layer, the second layer including an extruded silicone material.

Embodiment 2

A method of forming a composite tube, including providing a first layer including a thermoplastic polymer having a Tg of not greater than about 160° C.; receiving, by an extrusion system, a silicone material; forming, by the extrusion system, a second layer including the silicone material adjacent to the first layer; and irradiating the silicone material with a radiation source to substantially cure the silicone material.

Embodiment 3

The composite tube or method of forming the composite tube of embodiments 1 or 2, wherein the thermoplastic polymer has a Tg of not greater than about 160° C., such as not greater than about 100° C., not greater than about 80° C., or even not greater than about 50° C.

Embodiment 4

The composite tube or method of forming the composite tube of embodiments 1 or 2, wherein the thermoplastic polymer is a polystyrene, a polyester, a silicone copolymer, silicone thermoplastic vulcanizate, a copolyester, a polyamide, a fluoropolymer, a polyethylene, a polypropylene, a polyether-ester copolymer, a thermoplastic urethane, a polyether amide block copolymer, a polyamide copolymer, a styrene block copolymer, a polycarbonate, a polyolefin elastomer, a thermoplastic vulcanizate, an ionomer, a polyoxymethylene (POM), an acrylonitrile butadiene styrene (ABS), an acetal, an acrylic, a polyvinyl chloride (PVC), or combination thereof.

Embodiment 5

The composite tube or method of forming the composite tube of embodiments 1 or 2, wherein the silicone material includes a liquid silicone rubber or a high consistency rubber.

Embodiment 6

The composite tube or method of forming the composite tube of embodiments 1 or 2, wherein the silicone material consists essentially of a liquid silicone rubber having a viscosity of about 50,000 centipoise to about 2,000,000 centipoise.

Embodiment 7

The composite tube or method of forming the composite tube of embodiments 1 or 2, wherein the first layer is in direct contact with the second layer.

Embodiment 8

The composite tube or method of forming the composite tube of embodiments 1 or 2, wherein the composite tube has a length of at least about 2 meters, at least about 5 meters, at least about 10 meters, at least about 20 meters, at least about 30 meters, at least about 50 meters, or even about 100 meters.

Embodiment 9

The composite tube or method of forming the composite tube of embodiments 1 or 2, wherein the radiation source is ultraviolet energy with a wavelength of about 10 nanometers (nm) to about 410 nm.

Embodiment 10

The composite tube or method of forming the composite tube of embodiments 1 or 2, wherein the second layer has an inner surface that defines a central lumen of the tube.

Embodiment 11

The composite tube or method of forming the composite tube of embodiment 10, further comprising at least a third layer adjacent to an outside surface of the first layer.

Embodiment 12

The composite tube or method of forming the composite tube of embodiment 11, wherein the third layer comprises a silicone material.

Embodiment 13

The composite tube or method of forming the composite tube of embodiments 1 or 2, wherein the first layer has an inner surface that defines a central lumen of the tube.

Embodiment 14

The method of forming the composite tube of embodiment 2, further including promoting adhesion between the first layer and the second layer by providing an adhesion promoter to the silicone material of the second layer, treating an outer surface of the first layer prior to the step of forming the second layer, or combination thereof.

Embodiment 15

The method of forming the composite tube of embodiment 14, wherein treating the outer surface includes chemical etching, physical-mechanical etching, plasma etching, corona treatment, chemical vapor deposition, or combinations thereof.

Embodiment 16

The method of forming the composite tube of embodiment 14, wherein treating the outer surface includes irradiating with ultraviolet energy with a wavelength of about 10 nanometers (nm) to about 410 nm.

Embodiment 17

The method of forming the composite tube of embodiment 2, wherein providing the first layer including the thermoplastic polymer includes extruding the thermoplastic material; and curing the thermoplastic material.

Embodiment 18

The method of forming the composite tube of embodiment 16, wherein curing the thermoplastic material includes irradiating with ultraviolet energy with a wavelength of about 10 nanometers (nm) to about 410 nm.

Embodiment 19

The method of forming the composite tube of embodiment 2, wherein forming the second layer from the silicone material includes extruding the silicone material to form an extruded layer.

Embodiment 20

The method of forming the composite tube of embodiment 2, further including thermally treating the composite tube.

Embodiment 21

The method of forming the composite tube of embodiment 20, wherein the thermal treatment is at a temperature not greater than the Tg of the thermoplastic elastomer or the heat of deflection temperature (HDT) of the thermoplastic elastomer.

Embodiment 22

The method of forming the composite tube of embodiment 20, wherein the thermal treatment is at a temperature of about 20° to about 200° C., such as about 20° C. to about 150° C., such as about 20° C. to about 100° C., such as about 40° C. to about 80° C., or even about 60° C. to about 80° C.

Embodiment 23

The composite tube or method of forming the composite tube of embodiments 1 or 2, wherein the oxygen permeation reduction of greater than about 50%, such as not greater than about 60%, such as not greater than about 70%, or even not greater than about 80%, compared to a traditional silicone tube.

Embodiment 24

The composite tube or method of forming the composite tube of embodiments 1 or 2, wherein the composite tube has an average reduction in water loss of greater than about 20%, such as greater than about 30%, such as greater than about 40%, or even greater than about 50%, compared to a traditional silicone tube consisting of a silicone material.

Embodiment 25

The composite tube or method of forming the composite tube of embodiments 1 or 2, wherein the composite tube has a pump life of at least about 100 hours, such as at least about 200 hours, or even at least about 400 hours.

Embodiment 26

The composite tube or method of forming the composite tube of embodiments 1 or 2, wherein the first layer and the second layer have an adhesive strength of cohesive failure.

Embodiment 27

The composite tube or method of forming the composite tube of embodiments 1 or 2, wherein a surface between the first layer and the second layer are free of a primer.

Embodiment 28

An apparatus including a composite tube according to embodiment 1, wherein the apparatus is a medical device, a pharmaceutical device, a biopharmaceutical device, a chemical delivery device, a laboratory device, a water treatment device, a food and beverage device, a document printing device, an industrial cleaning device, an automotive device, an aerospace device, an electronics device, or a fuel delivery device.

Embodiment 29

A method including providing a medical device including a pump and a composite tube according to embodiment 1; and dispensing fluid to a patient with the medical device.

Embodiment 30

An apparatus, including a composite tube according to embodiment 1; and a pump coupled to the tube to dispense fluid contained in the tube.

Embodiment 31

The apparatus or method of embodiments 29-30, wherein the pump includes a medical device to provide the fluid to a patient.

Embodiment 32

The apparatus or method as recited in any one of embodiments 29-31, wherein the pump is a peristaltic pump.

Embodiment 33

The apparatus or method as recited in any one of embodiments 29-32, wherein the pump is an infusion pump or an enteral feeding pump.

Embodiment 34

A composite tube including a first layer including a polyether-ester block copolymer; and a second layer adjacent to the first layer, the second layer including an extruded silicone material having a viscosity of about 50,000 centipoise to about 2,000,000 centipoise; wherein the composite tube has a length of at least about 5 meters.

Embodiment 35

A composite tube including a first layer including a thermoplastic polyurethane; and a second layer adjacent to the first layer, the second layer including an extruded silicone material having a viscosity of about 50,000 centipoise to about 2,000,000 centipoise; wherein the composite tube has a length of at least about 5 meters.

Embodiment 36

A composite tube including a first layer including a silicone material; a second layer adjacent the first layer including a barrier layer; and a third layer adjacent to the second layer, the second layer including an extruded silicone material; wherein the composite tube has a length of at least about 5 meters.

Embodiment 37

The composite tube of embodiment 36, wherein the barrier layer is a thermoplastic urethane.

Embodiment 38

The composite tube of embodiment 36, wherein the silicone material includes a liquid silicone rubber, a high consistency rubber, or a room temperature vulcanizing silicone.

The concepts described herein will be further described in the following examples, which do not limit the scope of the disclosure described in the claims. The following examples are provided to better disclose and teach processes and compositions of the present invention. They are for illustrative purposes only, and it must be acknowledged that minor variations and changes can be made without materially affecting the spirit and scope of the invention as recited in the claims that follow.

EXAMPLES

Example 1

A composite tube is extruded with a first layer consisting of a thermoplastic polyester elastomer and a second layer of a UV cured liquid silicone rubber (LSR). The thermoplastic polyester elastomer has a Tg of −20° C. The tubing is co-extruded using a crosshead die. When exiting the die, the composite tubing first enters a UV radiation cure oven with a wavelength of about 200 to 450 nm. The composite tubing has an inner diameter of 0.125" and an overall outer diameter of 0.250". The thickness of the first thermoplastic polyester elastomer layer is 0.010" and the thickness of the outer UV cured silicone layer is 0.052".

The composite tube resulted in improved performance for water vapor transmission (WVTR) compared to a traditional silicone tube. In the present example, "a traditional silicone tube" the composite tube is compared against is a thermally, cured platinum catalyzed high consistency rubber (HCR) silicone tube. A Permatran W700 WVTR analyzer is used to compare the WVTR of the composite tube of size 0.125" ID by 0.250" OD described above as well as a traditional silicone tube with dimensions 0.125" ID by 0.250" OD. The test is run with the atmosphere on the OD of the tubing at 23° C. and 100% relative humidity. The test gas used is Nitrogen at a rate of 100 sccm for an overall exam cycle of 60 minutes. The average WTVR for the silicone tube is 0.0041 g/(cm-day) and the average WVTR for the composite tube is 0.0026 g/(cm-day). This is approximately a 35% reduction in water loss through the tubing wall.

Figure 5:
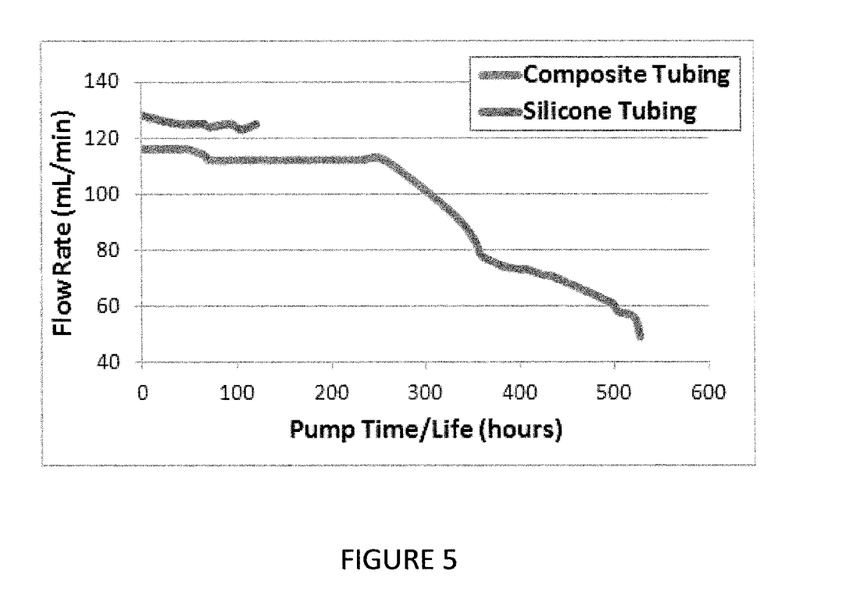
FIG. 5 is a graphical depiction of the average flow rate behavior of an exemplary composite tube in comparison to a traditional silicone tube.

The composite tube also results in improved performance for pump life compared to traditional silicone tubing. FIG. 5 shows the average flow rate behavior and pump life for the 0.125" ID by 0.250" OD composite tubing versus a similar sized product made from silicone. The pump used for this testing is a Cole Parmer Masterflex L/S pump drive equipped with a standard pump head and operated at 400 rpm. The pump fluid for this test is water at 23° C. FIG. 5 shows that the pump life of the composite tubing is approximately 4-5 times the length of the traditional silicone tube.

Also noted is that the flow rate of the composite tubing is stable for approximately the first 200 hours of its life which is ideal for some applications where pump accuracy is needed.

Example 2

A composite tube is extruded with a first layer consisting of an aromatic polyester-based thermoplastic polyurethane and a second layer of a UV cured liquid silicone rubber (LSR). The thermoplastic polyurethane has a Tg of −42° C. The tubing is co-extruded using a cross-head die in a jacketing type process. When exiting the die, the composite tube enters a UV radiation cure oven with a wavelength about 200 to 450 nanometers. The composite tubing has an inner diameter of 0.125" and outer diameter of 0.250". The thickness of the first thermoplastic urethane layer is 0.008" and the thickness of the outer UV cured silicone layer is 0.054".

Figure 6:
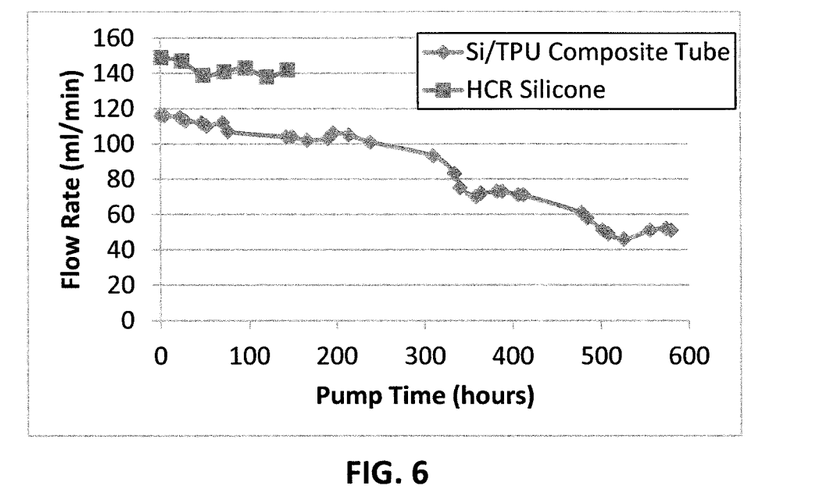
FIG. 6 is a graphical depiction of pump performance of an exemplary composite tube in a peristaltic pump.

The composite tubing results in improved performance for pump life compared to traditional HCR silicone tubing. FIG. 6 shows the average flow rate behavior and pump life for the 0.125" ID by 0.250" OD composite tubing versus a similar sizes tube made from silicone. The pump used for this testing is a Cole Parmer Masterflex L/S pump drive equipped with Cole Parmer's Easy-Load pump head and operated at 400 rpm. The pump fluid for this test is water at 20° C. FIG. 6 shows that the pump life of the composite tubing is approximately 3-4 times longer than that of the HCR silicone tubing. Although the HCR silicone has a higher initial flow rate under the same pump conditions, the flow rate stability over the first 150 hours is similar.

Example 3

A composite tube is extruded with a first layer consisting of thermoplastic co-polyester elastomer and a second layer of a UV cured high consistency silicone rubber (HCR). The thermoplastic co-polyester elastomer has a Tg of −20° C. The tubing is co-extruded using a cross-head die in a jacketing type process. When exiting the die, the composite tube enters a UV radiation cure oven with a wavelength about 200 to 450 nanometers. The composite tubing has an inner diameter of 0.250" and outer diameter of 0.450". The thickness of the first thermoplastic co-polyester elastomer layer is 0.010" and the thickness of the outer UV cured silicone layer is 0.090".

Figure 7:
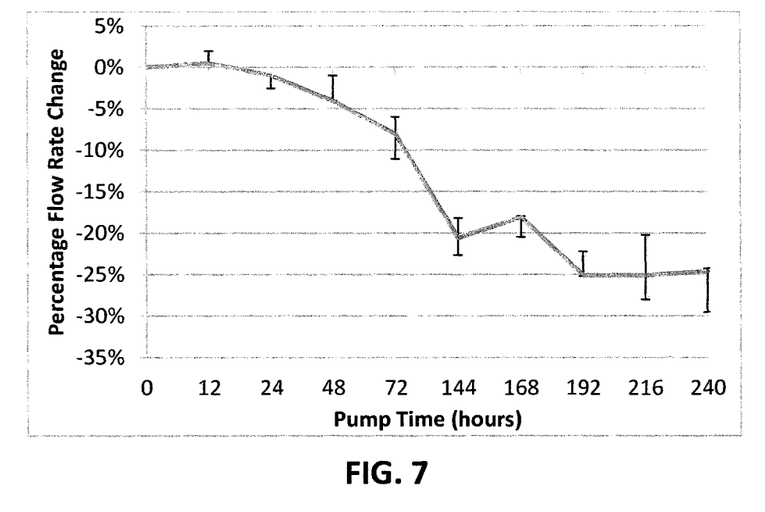
FIG. 7 is a graphical depiction of pump performance of an exemplary composite tube.

The composite tubing results in improved pump life compared to traditional silicone tubing of a heat-cured HCR with a platinum catalyst. More importantly the composite tubing does not have a catastrophic failure/leakage. Unlike traditional silicone tubing, the composite tubing maintains integrity of the fluid contact layer and does not rupture to cause failure. The failure is always due to the percentage drop in flow rate falling below 25% (a typical requirement in applications such as chemical pumping). FIG. 7 shows the pump time/life of the tubing along with the % flow rate change. The pump used for this testing is a Cole Parmer Masterflex L/S pump drive equipped with Cole Parmer's Easy-Load pump head and operated at 400 rpm. The pump fluid for this test is water at 23° C.

Figure 8:
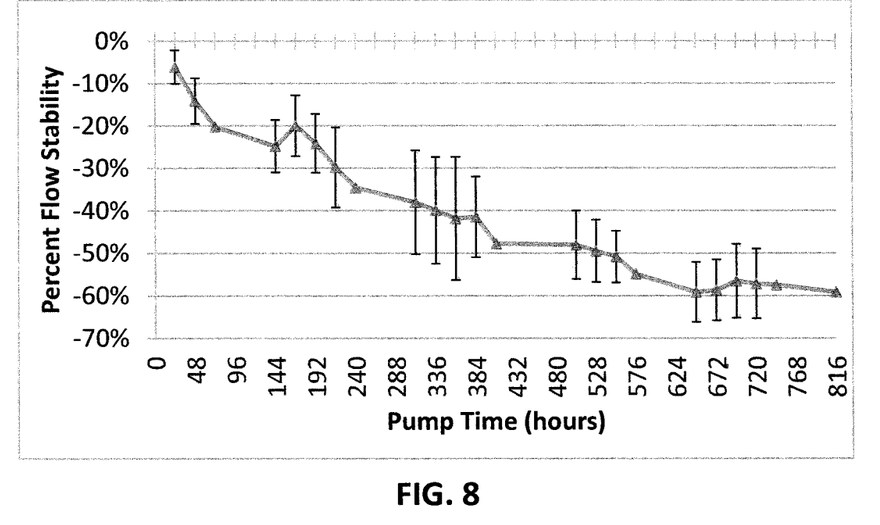
FIG. 8 is a graphical depiction of intermittent pump performance of an exemplary composite tube.

The composite tube also results in long pump life in intermittent pumping conditions as is typically in chemical dosing applications. FIG. 8 shows the pumping time of the composite tubing vs. percentage flow rate stability during an intermittent pumping testing. The pump used for this testing is a Cole Parmer Masterflex L/S pump drive equipped with Cole Parmer's Easy-Load pump head and operated at intermittently at 100 rpm and 15 psi back pressure. The pump would run at 100 rpm and 15 psi back pressure for 5 minutes and then would turn off for 10 minutes, with this cycle repeating until failure. The pump fluid for this test is water at 23° C. FIG. 8 shows that the composite tubing had a continual drop in flow rate, however had a very long pump life. Similar to the continuous pumping testing, the composite tubing did not fail via rupture/leakage which is an advantage over traditional silicone or rubber tubing in some applications of chemical pumping.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A composite peristaltic pump tube consisting of:
   a first layer having an inner surface that defines a central lumen of the tube, the first layer comprising a thermoplastic polymer having a Tg of not greater than about 160° C., wherein the thermoplastic polymer is a copolyester, a polyether-ester copolymer, a thermoplastic urethane, a polyether amide block copolymer, or combination thereof; and
   a second layer having a length equivalent to a length of the first layer, the second layer directly bonded to the first layer, the second layer comprising an extruded silicone material, wherein the bond between the first layer and the second layer has an adhesive strength of cohesive failure along an entire length of the tube; wherein the composite peristaltic pump tube has a pump life of greater than about 48 hours, as measured by peristaltic pumping at 400 rpm.

2. The composite peristaltic pump tube of claim 1, wherein the thermoplastic polymer has a Tg of not greater than about 100° C.

3. The composite peristaltic pump tube of claim 1, wherein the thermoplastic polymer is a copolyester, a polyether-ester copolymer, a thermoplastic urethane, or combination thereof.

4. The composite peristaltic pump tube of claim 1, wherein the silicone material comprises a liquid silicone rubber or a high consistency rubber.

5. The composite peristaltic pump tube of claim 1, wherein the silicone material consists essentially of a liquid silicone rubber having a viscosity of about 50,000 centipoise to about 2,000,000 centipoise.

6. The composite peristaltic pump tube of claim 1, wherein the first layer is in direct contact with the second layer.

7. The composite peristaltic pump tube of claim 1, wherein the composite tube has a length of at least about 2 meters.

8. The composite peristaltic pump tube of claim 1, wherein the extruded silicone material is cured via a radiation source.

9. An apparatus, comprising:
a composite peristaltic pump tube consisting of a first layer having an inner surface that defines a central lumen of the tube, the first layer comprising a thermoplastic polymer having a Tg of not greater than about 160° C., wherein the thermoplastic polymer is a copolyester, a polyether-ester copolymer, a thermoplastic urethane, a polyether amide block copolymer, or combination thereof; and a second layer having a length equivalent to a length of the first layer, the second layer directly bonded to the first layer, the second layer comprising an extruded silicone material, wherein the bond between the first layer and the second layer has an adhesive strength of cohesive failure; wherein the composite peristaltic pump tube has a pump life of greater than about 48 hours, as measured by peristaltic pumping at 400 rpm; and
a pump coupled to the tube to dispense fluid contained in the tube.

* * * * *